United States Patent
Su et al.

(10) Patent No.: US 10,710,788 B2
(45) Date of Patent: *Jul. 14, 2020

(54) HERMETIC PACKAGES WITH LASER SCORED VENT SYSTEMS

(71) Applicant: Berry Plastics Corporation, Evansville, IN (US)

(72) Inventors: Jau-Ming Su, Kent, WA (US); Paul Z. Wolak, Indianapolis, IN (US)

(73) Assignee: Berry Plastics Corporation, Evansville, IN (US)

( * ) Notice: Subject to any disclaimer, the term of this patent is extended or adjusted under 35 U.S.C. 154(b) by 791 days.

This patent is subject to a terminal disclaimer.

(21) Appl. No.: 15/344,237

(22) Filed: Nov. 4, 2016

(65) Prior Publication Data

US 2017/0066581 A1    Mar. 9, 2017

Related U.S. Application Data

(60) Continuation of application No. 14/179,818, filed on Feb. 13, 2014, now Pat. No. 9,505,543, which is a
(Continued)

(51) Int. Cl.
*B65D 79/00* (2006.01)
*B65D 81/34* (2006.01)
(Continued)

(52) U.S. Cl.
CPC .............. *B65D 79/005* (2013.01); *B32B 3/02* (2013.01); *B32B 7/12* (2013.01); *B32B 27/08* (2013.01); *B32B 27/16* (2013.01); *B32B 27/28* (2013.01); *B32B 27/306* (2013.01); *B32B 27/32* (2013.01); *B32B 27/34* (2013.01); *B32B 27/36* (2013.01);
(Continued)

(58) Field of Classification Search
CPC ............ B32B 2307/31; B32B 2439/00; B32B 2439/70; B32B 27/08; B32B 27/16; B32B 27/28; B32B 27/306; B32B 27/32; B32B 27/34; B32B 27/36; B32B 27/38; B32B 27/40; B32B 3/02; B32B 7/12;
(Continued)

(56) References Cited

U.S. PATENT DOCUMENTS 2,811,455 A    10/1957  Erekson
3,334,803 A     8/1967  Abbey
(Continued)

FOREIGN PATENT DOCUMENTS

CN    101171185    4/2008
DE    202007003168  5/2007
(Continued)

OTHER PUBLICATIONS

Australian Search Report cited in Patent Application No. 2009257891 dated Oct. 8, 2013, 4 pages.
(Continued)

*Primary Examiner* — Dana Ross
*Assistant Examiner* — Ket D Dang
(74) *Attorney, Agent, or Firm* — Barnes & Thornburg LLP

(57) ABSTRACT

A hermetically sealed package, for example a freezable microwavable package containing a food product, has a sealing film that includes a vent system that is scored by a laser into the package.

20 Claims, 4 Drawing Sheets

Related U.S. Application Data division of application No. 12/997,175, filed as application No. PCT/US2009/044657 on May 20, 2009, now Pat. No. 8,686,324.

(60) Provisional application No. 61/060,205, filed on Jun. 10, 2008.

(51) Int. Cl.
*B32B 3/02* (2006.01)
*B32B 27/32* (2006.01)
*B32B 7/12* (2006.01)
*B32B 27/36* (2006.01)
*B32B 27/30* (2006.01)
*B32B 27/16* (2006.01)
*B32B 27/40* (2006.01)
*B32B 27/34* (2006.01)
*B32B 27/38* (2006.01)
*B32B 27/08* (2006.01)
*B32B 27/28* (2006.01)

(52) U.S. Cl.
CPC ............ *B32B 27/38* (2013.01); *B32B 27/40* (2013.01); *B65D 81/3453* (2013.01); *B65D 81/3461* (2013.01); *B32B 2307/31* (2013.01); *B32B 2439/00* (2013.01); *B32B 2439/70* (2013.01); *B65D 2205/00* (2013.01); *B65D 2581/3435* (2013.01)

(58) Field of Classification Search
CPC ........ B65D 2205/00; B65D 2581/3435; B65D 79/005; B65D 81/3453; B65D 81/3461
USPC ............. 219/650, 725, 730, 734, 759, 728; 428/34.3, 34.02, 195.1, 35.2, 35.7, 216, 428/457, 606, 36.6, 343, 14, 5.1, 35.4, 428/36.5, 137, 38, 347, 349, 354, 480, 428/483, 516, 517, 317.1; 383/120, 121, 383/122, 109, 207, 209, 103, 113, 116; 426/107, 113, 127, 234, 412; 53/133.6, 53/133.3, 133.8, 412, 452, 453, 455, 450, 53/461, 462, 463, 469, 479, 481, 410
See application file for complete search history.

(56) References Cited

U.S. PATENT DOCUMENTS

| | | | |
|---|---|---|---|
| 3,477,194 A * | 11/1969 | Corrsin | B29C 65/1412 156/272.8 |
| 3,909,582 A * | 9/1975 | Bowen | B23K 26/0846 219/121.69 |
| 4,124,965 A | 11/1978 | Stahl | |
| 5,630,308 A | 5/1997 | Guckenberger | |
| 5,908,676 A | 6/1999 | Otaki | |
| 6,231,236 B1 | 5/2001 | Tilman | |
| 6,719,678 B1 | 4/2004 | Stern | |
| 7,118,792 B2 | 10/2006 | Hewitt | |
| 7,254,873 B2 | 8/2007 | Stolmeier | |
| 7,316,833 B1 | 1/2008 | Galloway | |
| 7,919,036 B2 | 4/2011 | Bauer | |
| 9,505,543 B2 * | 11/2016 | Su | B32B 3/02 |
| 2003/0124294 A1 | 7/2003 | Hodson | |
| 2003/0231811 A1 | 12/2003 | Hodson | |
| 2004/0180118 A1 | 9/2004 | Renger | |
| 2005/0069610 A1 | 3/2005 | Connolly | |
| 2005/0084636 A1 * | 4/2005 | Papenfuss | B32B 27/08 428/35.7 |
| 2005/0109452 A1 * | 5/2005 | Basque | B23K 26/032 156/251 |
| 2005/0208282 A1 | 9/2005 | Wood | |
| 2005/0284789 A1 * | 12/2005 | Carespodi | B32B 15/08 206/461 |
| 2006/0210774 A1 | 9/2006 | Linzell | |
| 2007/0087096 A1 * | 4/2007 | Mir | B65D 33/01 426/415 |
| 2007/0215609 A1 | 9/2007 | Su | |
| 2009/0029082 A1 * | 1/2009 | Remmele | B29C 59/007 428/35.2 |
| 2009/0152333 A1 | 6/2009 | Maeaettae | |
| 2009/0178945 A1 | 7/2009 | Moehlenbrock | |
| 2009/0197341 A1 | 8/2009 | Patel | |
| 2009/0220749 A1 * | 9/2009 | O'Donoghue | B41M 5/30 428/195.1 |
| 2009/0304874 A1 | 12/2009 | Stephens | |
| 2010/0025392 A1 | 2/2010 | Nishi | |
| 2010/0247822 A1 * | 9/2010 | Ziolkowski | B32B 3/30 428/35.2 |

FOREIGN PATENT DOCUMENTS

| | | |
|---|---|---|
| JP | 63094167 | 4/1988 |
| JP | 08198320 | 8/1996 |
| JP | 11079260 | 3/1999 |
| JP | 11147559 | 6/1999 |
| JP | 11292093 | 10/1999 |
| JP | 2001031114 | 2/2001 |
| JP | 2001031148 | 2/2001 |
| JP | 2005306426 | 11/2005 |
| JP | 2005324846 | 11/2005 |
| JP | 2007331816 | 12/2007 |
| JP | 2011011755 | 1/2011 |
| WO | 2006034793 | 4/2006 |
| WO | 2006075141 | 7/2006 |

OTHER PUBLICATIONS

Canadian Examination Report, Application No. 2727938, dated Apr. 20, 2016.
European Search Report dated Dec. 20, 2012 for EP09763192.3.
First Office Action in related Chinese application No. 200980125949.1 dated Mar. 1, 2012 (in Chinese language translation), 31 pages.
Japanese Office Action for Application No. JP 2011-513542, dated Dec. 4, 2012.
Office action from New Zealand patent application No. 589982 dated Jan. 11, 2012, 2 pages.
PCT International Search Report and Written Opinion for PCT/US2009/044657 completed by the US Search Authority dated Jul. 14, 2009.

* cited by examiner

HERMETIC PACKAGES WITH LASER SCORED VENT SYSTEMS

CROSS-REFERENCE TO RELATED APPLICATIONS

This application is a continuation of U.S. application Ser. No. 14/179,818, filed Feb. 2, 2013, which is a division of U.S. application Ser. No. 12/997,175, filed Dec. 9, 2010, which is a U.S. national counterpart application of International Application Serial No. PCT/US2009/044657, filed May 20, 2009, which claims priority to U.S. Provisional Application No. 61/060,205, filed Jun. 10, 2008, each of which are expressly incorporated by reference herein.

BACKGROUND OF THE INVENTION

The present technology generally relates to venting systems for use with films that are suitable for use as, or with, food packaging. More specifically, the present technology relates to food packaging that includes, in certain embodiments, a freezable, microwaveable film layer having a venting system that facilitates the heating or cooking of hermetically packaged food contents at desirable temperatures and/or pressures.

In recent yearn, there has been an increase in the number of food products that are designed or intended to go directly from the freezer to the microwave for heating or cooking. Such food products often require packaging that also can go directly from freezer storage temperatures, typically temperatures ranging from about −20° C. to about 0° C., to microwave heating or cooking temperatures ranging from about 71° C. or greater. Additionally, it is desirable that such packaging perform without fracturing in the freezer, and without melting or bursting in the microwave. For example, with respect to foods such as vegetables, the temperatures reached during microwave cooking typically range from about 71° C. to about 105° C. However, when the packaged food items include meats, fish, grease, and/or oils, for example, the temperature of the items can reach up to about 150° C. when heated during microwave preparation.

Many freezable and microwaveable food packages can be made from, or Include, a sealing film, such as the multilayered films discussed and disclosed in U.S. patent application Ser. Nos. 11/374,893 and 11/650,903, both of which are incorporated herein by reference in their entirety. Further, such films may be used for a variety of different types of food packages, which may have a variety of sizes and configurations. For example, a sealing film may be configured to form a pouch, wherein the sealing film is oriented to provide an inner region that is configured to receive the placement of a food product. Further, the edges of the sealing film may be sealed together so that the food product in the Inner region is hermetically sealed. Other food packages may include a tray container having a base and sidewalls that form the inner region. The inner region of the tray container may also include one or more food compartments that receive the placement of food products. Often, the inner region of the tray container is covered by attaching a freezable, microwaveable sealing film to the top of the sidewalls or to a flange area so that the food product contained therein is hermetically sealed.

To ensure proper cooking of the food product in the microwave, and to prevent the food package from bursting, many existing freezable, microwaveable food packages require the inclusion of a vent for the cooking or heating cycle. More specifically, a vent may be added to the sealing film so as to release heat and/or steam that may be generated while cooking or heating the food product in the microwave.

Some freezable, microwaveable food packages do not include a steam vent system, but instead rely on the user to create the vent by piercing a slot or hole into the sealing film prior to placing the food package into the microwave.

Other types of freezable, microwaveable food packages include built-in steam venting systems. For example, a food package may have built-in holes or slits on the sides or end seals of the sealing film that may be formed by mechanical apparatuses, such as cutters or punches. Additionally, some food packages may have vent systems in the form of micro-perforated zones or strips in the sealing film. In some instances, such slits or openings may be formed in a portion of a food package and is subsequently covered or closed by the addition of a laminate to the food package.

Some freezable, microwaveable food packages provide a built-in vent by scoring a line across most, if not all, the length of the sealing film of the food package to create a line where the film may tear during the cooking operation. For example, some food packages may use an approximately 6 inch (15 cm) long scored line across nearly the entire length of a freezable, microwaveable food package that is in the form of a pouch. Moreover, this scored line may extend from approximately one seam or edge to the opposite seam or edge of the package.

BRIEF SUMMARY OF THE INVENTION

One aspect of the present invention is a heatable package that includes an inner region, which is configured to receive a product, and a sealing film. "Product" is broadly defined here to include any material that can generate pressure when heated, either by an external source or by an Internal change of conditions.

The sealing film is comprised of at least one layer of a microwavable film that is adapted for use in heating a product, and Includes an outer surface and an inner surface. According to some embodiments, the sealing film may be a freezable/microwaveable sealing film. The inner region of the package may be hermetically sealed by at least a portion of the sealing film. At least one vent pattern is scored by a laser into a portion of the outer surface of the sealing film to form at least one weakened wall pattern. The vent pattern is scored in the sealing film at a depth that does not perforate the sealing film. Further, the inner surface adjacent to the weakened wall pattern is directly exposed to pressure generated in the Inner region.

Another aspect of the invention is a heatable package having a multilayered sealing film that has an inner surface and an outer surface, and which is configured to cover the inner portion of the package that contains a product. The inner portion also includes an inner portion span. A vent system comprised of a linear or non-linear vent pattern scored by a laser into the outer surface of the multilayered sealing film at a depth that does not perforate the sealing film, and which creates a weakened wall pattern. The weakened wall pattern extends down to at least an adjacent portion of the inner surface. According to certain embodiments, the vent pattern has a vent pattern span that may be from 1% to 100%. According to other embodiments, the vent pattern has a vent pattern that is a fraction of the size of the inner region span, such as, for example, a vent pattern that is 1% to 50% the size of the inner region span. Further, the inner surface of the sealing film that is adjacent to the weakened wall pattern is directly exposed to pressure generated inside the inner region during heating.

Another aspect of the Invention is a method for providing a vent system in a heatable package that includes scoring at least one linear or non-linear vent pattern into a sealing film of a package with a laser to form a weakened wall pattern. The vent pattern may have a weakened wall thickness of approximately 5 µm to approximately 25 µm, and may be scored into the sealing film at a depth that does not perforate the sealing film. The vent pattern also has a vent pattern span, which is the greater of the maximum length and width of the vent pattern.

This aspect of the method further includes sealing at least a portion of the sealing film to form a pouch that has an inner surface and an Inner region. The inner region of the pouch is configured to receive a product. At least a portion of the Inner surface of the sealing film is adjacent to the weakened wall portion.

This aspect of the method also includes sealing the inner region of the pouch to hermetically seal a product contained therein. The sealed inner region has an inner region span that is equal to the greater of the maximum length and width of the Inner region. Additionally, each vent pattern has a vent pattern span that is from 2% to 15% of the size of the inner region span.

The method also includes generating a pressure in the inner region during heating, wherein the inner surface of the sealing film that is adjacent to the weakened wall portion is directly exposed to the generated pressure.

Figure 1:
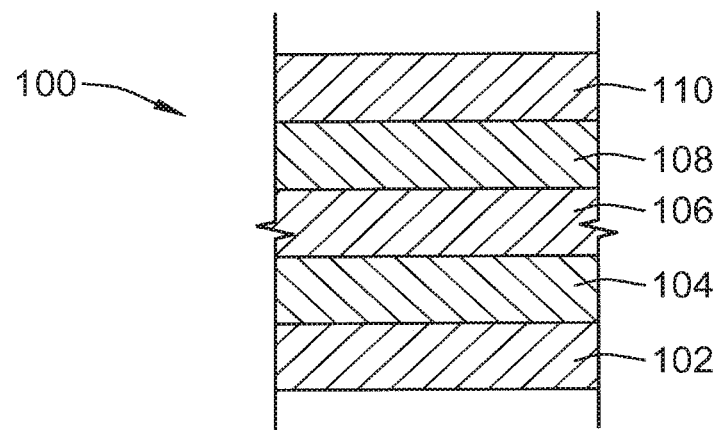
FIG. 1 is a cross-sectional view of a sealing film for use with a vent system according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentalities shown in the attached drawings or identified in this specification.

DETAILED DESCRIPTION OF THE INVENTION

FIG. 1 is a cross-sectional view of a sealing film 100 for use with a vent system according to an embodiment of the present invention. The sealing film 100 may have at least two layers, for example a core layer 104 positioned adjacent to an inner, heat sealable layer 102. In the embodiment illustrated in FIG. 1, the sealing film 100 may also include an outer skin layer 106 positioned adjacent to the core layer 104. Further, an outer protective layer 110 may be adhered, such as through the use of an adhesive 108, to the outer skin layer 106.

Each layer of the sealing film 100 may be constructed from a variety of different base materials. For example, each layer of film in the sealing film 100 may be made from the same or different base materials, including a thermoplastic polymer, polyolefin, polyethylene, polypropylene, propylene/ethylene copolymer, or propylene/alpha-olefin copolymer, along with derivatives thereof, among others. Examples of the adhesive 108 include, but are not limited to, polyurethane, epoxides, hot-melt ethylene vinyl acetate, hot melt polyamide, and hot-melt polyester. Further, the sealing film 100 may be manufactured using a variety of film processing techniques, for example by lamination and coextrusion, including blown film coextrusion and a cast film process, among others. Further, the thickness of the sealing film 100 may depend, at least in part, on the size of the food package to be made from, or to include, the film 100. For example, according to certain embodiments, the sealing film 100 may have a thickness from about 2 mils to about 5 mils (50 to about 130 microns). The sealing film 100 optionally can be constructed to withstand freezing, followed by heating to a cooking or other processing temperature.

Figure 2:
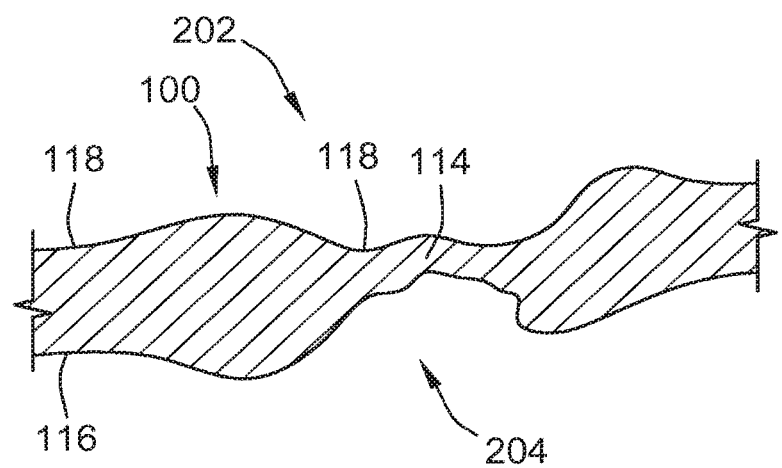
FIG. 2 is a cross-sectional view of a portion of a steam vent system having a scored vent pattern and the resulting weakened wall pattern across a portion of a sealing film according to an embodiment of the present invention.

FIG. 2 is a cross-sectional view of a portion of a steam vent system 202 having a scored vent pattern 204 and the resulting weakened wall pattern 114 across a portion of a sealing film 100 according to an embodiment of the present invention. As shown in FIG. 2, the sealing film 100 may have an outer surface 116 and an inner surface 118.

According to certain embodiments, the vent pattern 204 may be created by a laser beam scoring at least one vent pattern 204 into the outer surface 116 of the sealing film 100. For example, the vent pattern 204 may be scored into the sealing film 100 using an approximately 10.2 µm or 10.6 µm wavelength $CO_2$ laser operated at about 20 watts to 200 watts. The laser can be scanned or otherwise moved related to the film 100, or vice versa, for example at 70 ft/min (0.36 m/sec). The vent pattern 204 can be scored into the sealing film 100 at a depth that does not perforate the sealing film 100. By not perforating the sealing film 100, the scored vent pattern 204 may allow the package 200 to be hermetically sealed, and thereby prevent or resist microorganisms or oxygen from entering into the package 200 through the vent pattern 204 that could contaminate or degrade the product contained therein. Further, the lack of perforations in the scored vent pattern 204 may prevent product contained within the package 200 from leaking out of the package 200 through the vent pattern 204.

Mechanically formed vent systems, such as those that cut, slit, or pierce the sealing film, typically rely on a subsequent lamination manufacturing step to cover openings in the sealing film created by such operations. In such operates, laminate is subsequently applied in an attempt to create a package that may be hermetically sealed. However, the use of a laser to score the package may remove the need for such a lamination procedure. More specifically, the laser, such as the approximately 10.2 µm or 10.6 µm wavelength $CO_2$ laser described above, may be operated to score the sealing film without cutting or piercing through the wall of the sealing film. And because such a laser may be operated so as to not create such openings, the sealing film may still be suitable for use in a hermetically sealed package without the need for the subsequent lamination procedure that may be associated with covering holes in mechanically formed vent systems.

The vent pattern 204 can define a weakened wall pattern 114 in the sealing film 100. For example, according to embodiments in which the sealing film 100 is a 3.5 mil (89 micron) laminate, the vent pattern 204 may be scored into the sealing film 100 to create a weakened wall pattern 114 that has a wall thickness of approximately 5 μm to approximately 25 μm.

Figure 3:
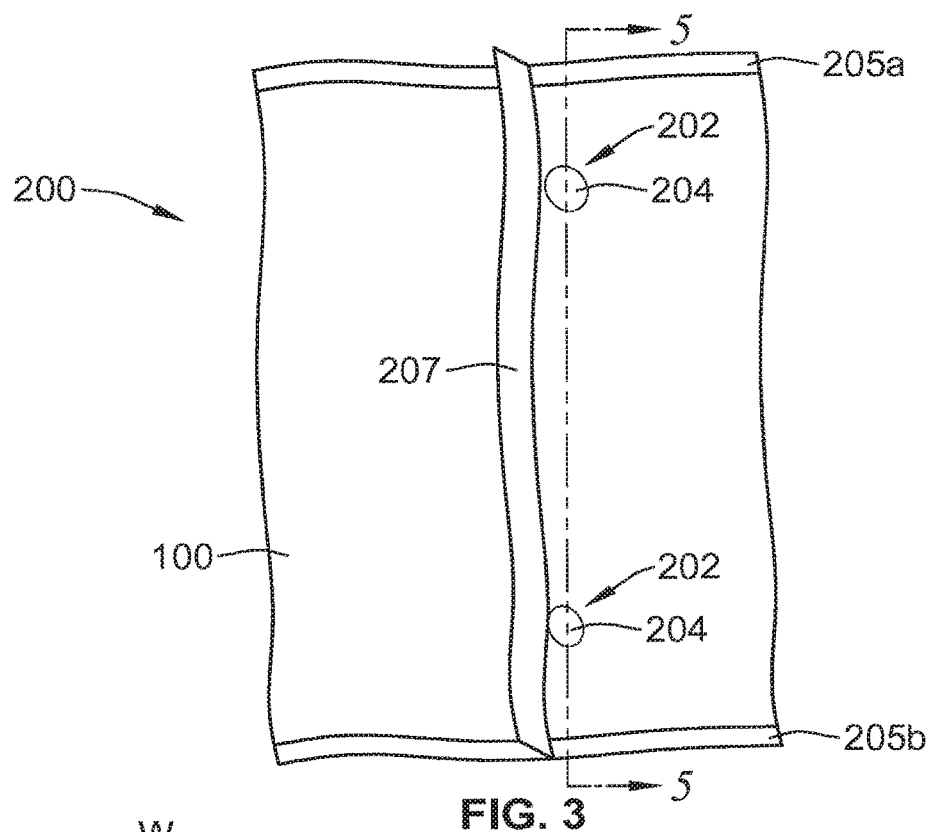
FIG. 3 is a perspective view of a freezable, microwaveable pouch-shaped food package having vent patterns in the form of circles according to an embodiment of the present invention.
Figure 4:
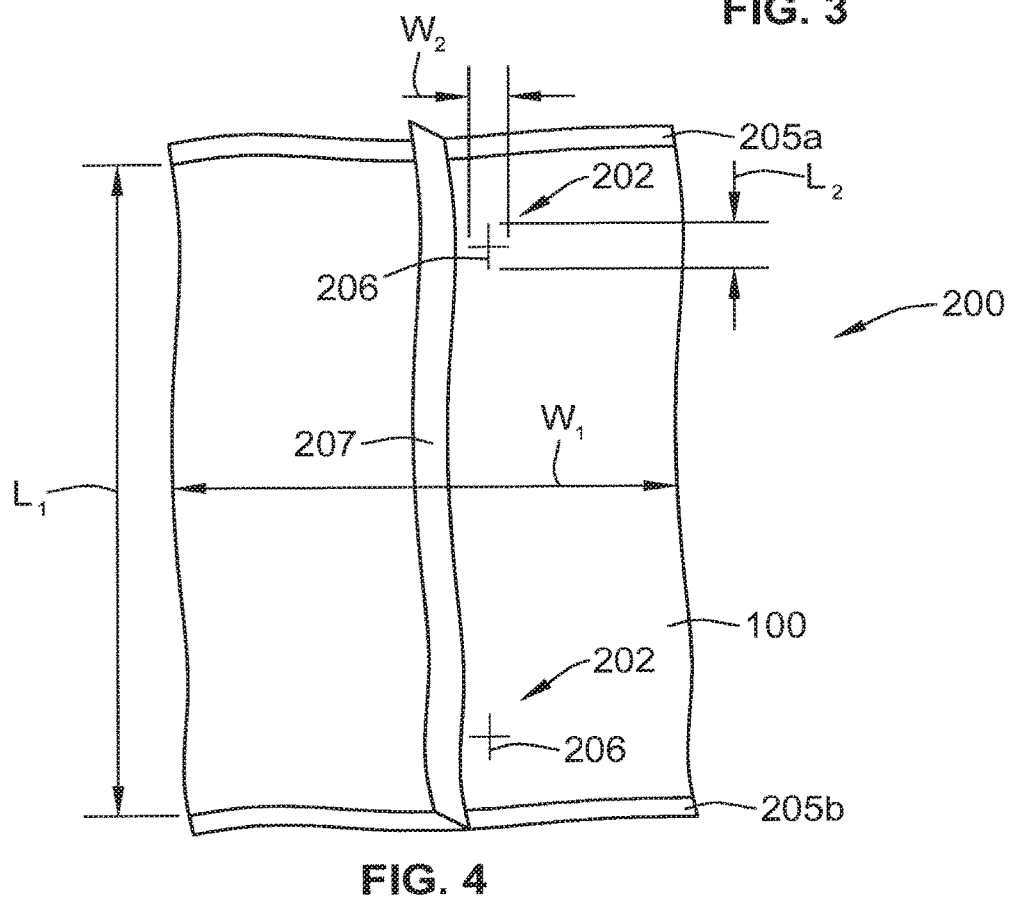
FIG. 4 is a perspective view of a freezable, microwaveable pouch-shaped food package having vent patterns in the form of crosses according to an embodiment of the present invention.

FIGS. 3 and 4 are perspective views of a freezable, microwaveable pouch-shaped food package 200 having a vent system 202 comprising vent patterns 204, 206 in the form of circles and crosses, respectively, according to embodiments of the present invention. The food package 200 may be manufactured using conventional packaging equipment. For example, according to embodiments in which the food package 200 is a pouch, vertical form fill and seal equipment or horizontal form fill and seal equipment may be used to form the food package 200. Typically, in the operation of such equipment, the sealing film 100 that is to be formed into the food package 200 is fed from a roll to the equipment where it is wrapped about a forming tube and a longitudinal heat seal is provided to form the fin seal 207, closing the sealing film 100 to form a tube. Thereafter, one end of the tube is closed and Inner heat seal layers are heat sealed together to form one end of an inner region, which is then filled with a predetermined quantity of product. The filled food package 200 is then closed and the Inner heat seal layers are heat sealed together at the open end to form a food product packaged in a hermetically sealed food package 200. As shown in FIGS. 3 and 4, the food package 200 may include end seals 205a, 205b, and a fin seal 207.

One can use a single scored line, which can be straight, curved, or a closed loop, to create a weakened wall pattern 114 forming the vent system 202. Alternatively, one can utilize two or more vent patterns such as 204, 206 that are scored into the outer surface 116 of the sealing film 100 by a laser or other means. For example, FIGS. 3 and 4 illustrate food packages 200 having a vent system 202 comprising at least one vent pattern, and have two vent patterns 204 or 206 per package, in the form of a circle or a cross, respectively. However, a variety of different shapes and patterns may be used to form the vent patterns 204, 206, for example closed loop patterns, such as a trapezoid, rectangle, square, triangle, oval, circle, as well as other non-linear patterns, such as crosses, "I"-shaped patterns, and "T"-shaped patterns, along with combinations and variations thereof, among others.

By using a vent pattern having short dimensions, rather than a single long scored line, the size of the vent created by separation along the pattern may be controlled. For example, if a long scored line is used, the entire line may open, whereby the pressure in the food package may drop to an atmospheric level that prevents the food product from being cooked uniformly to a desired temperature, and which may then result in insufficient cooking or heating or cold spots in the cooked or heated food or other product. Alternatively, the scored line may not open, which may cause the food package to burst or delaminate, or cause contents to leak out of the seal. Another possible result is loss of the hot food product from the food package, which presents a safety hazard for the user.

The amount of steam generated during the heating or cooking of a product, and thus the amount of pressure needed to be released from the package 200 in order to maintain desired pressures and temperatures without bursting the package 200, depends on a variety of factors. For example, if the product to be heated or cooked is a frozen food product, the vent system 202 may be designed with consideration given to such factors, such as the food type, moisture content, the size and weight of food package 200, and anticipated microwave power, among other factors. Moreover, in such instances, the vent system 202 may be configured to allow for a heating or steam pressure of 0.25 to 2.0 psi to be maintained within the package 200 so that the food product contained therein may be uniformly heated or cooked at a desired temperature, such as above 160° F.

The vent pattern such as 204, 206 may be sized to accommodate the various types and weights of food products that are packaged within the food package 200. For example, for a 12 ounce (340 g) frozen food product that is contained in an approximately 6.5 inch (17 cm) wide by 9 inch (23 cm) long food package 200, the vent system 202 may include two circular vent patterns 204 having a diameter of approximately 4 mm to 20 mm, or Include two vent patterns 206 in the shape of crosses, wherein at least one and optionally both of the intersecting lines of the cross has a length of 4 mm to 20 mm.

The vent pattern 204, 206 can have a line thickness and/or depth that allows for the formation of the weakened wall pattern 114, while still allowing a hermetic seal to be formed and/or maintained about the packaged food product. Further, the line thickness and/or depth of the vent pattern 204, 206 can be such as to prevent the food package 200 from opening along at the weakened wall pattern 114 prior to, or too early during, the cooking or heating of the food package. Additionally, the line thickness and/or depth of the vent pattern 204, 206 can be sized to be large enough to allow at least a portion of the weakened wall pattern 114 to open during cooking or heating, as necessary so that undesirable excess pressure may be released from within the food package 200, but small enough to allow a desired pressure level to be maintained inside the food package 200. This can be accomplished, for example, by sizing the vent pattern 204, relative to the desired heating conditions, so the pattern 204 opens to create a vent when the desired triggering pressure is generated in the package 200, and so steam or other vapor at the desired pressure is released through the vent at about the same rate as additional steam is formed.

According to certain embodiments, the vent pattern 204, 206 may have a wall thickness of approximately 5 μm to approximately 25 μm. Such a wall thickness for the vent patterns 204, 206 may also facilitate the generation of micro-voids or cracks in the weakened wall pattern 114 as the sealing film is expanded during heating.

Figure 5:
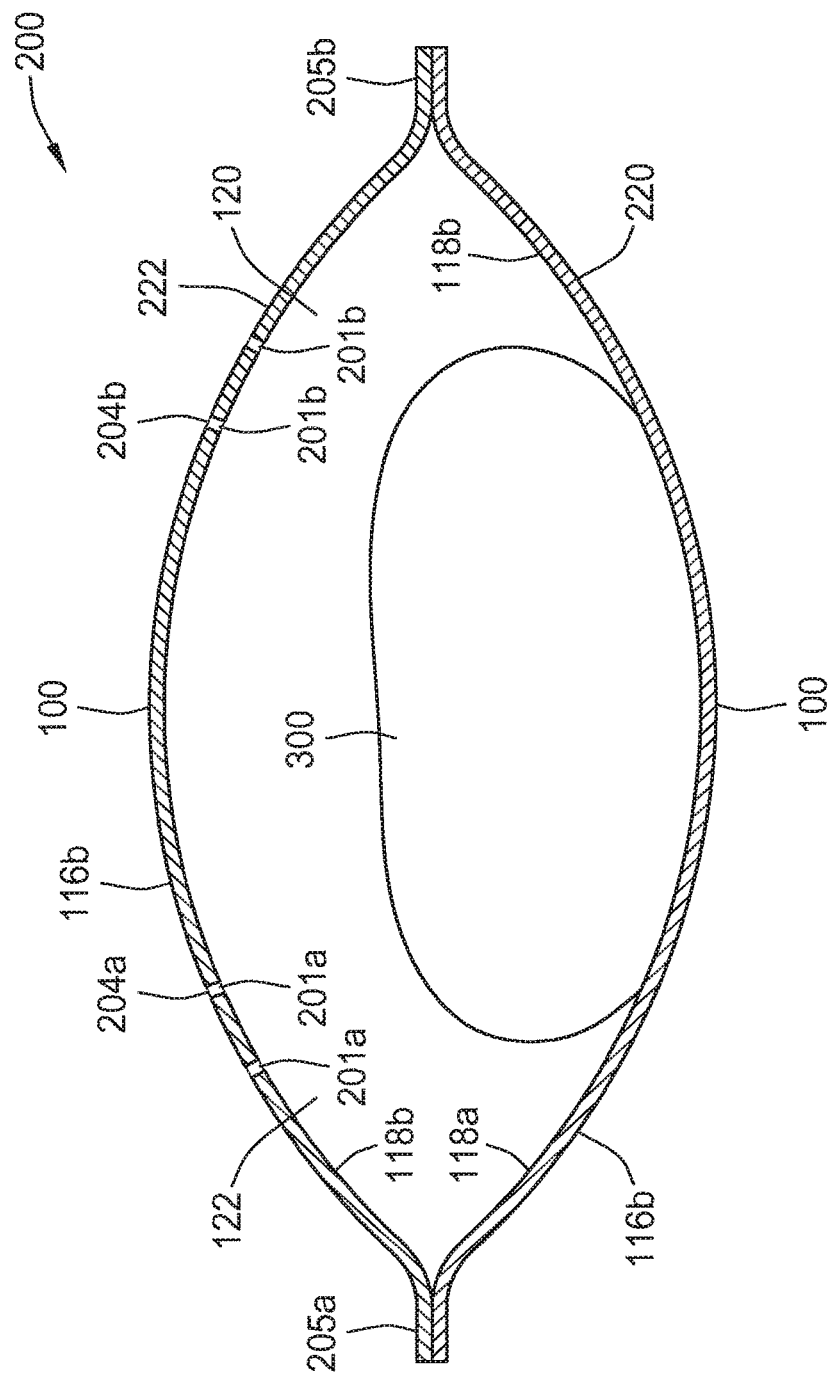
FIG. 5 is a sectional view taken along section line 5-5 of FIG. 3 of a partially expanded freezable, microwaveable pouch-shaped food package having an opened vent according to an embodiment of the present invention.

FIG. 5 is a sectional view taken along section line 5-5 of FIG. 3 of a partially expanded freezable, microwaveable pouch-shaped food package 200 having opened vents 201a, 201b according to an embodiment of the present invention. As shown in FIG. 5, the sealing film 100 may be oriented so that the food package 200 may include a first wall 220 and a second wall 222. The food package 200 may be placed within the microwave with the outer surface 116b of the second wall 222 facing in a generally upward direction. Accordingly, the food product 300 may in the inner region 120 against at least a portion of the inner surface 118a of the first sidewall 220.

As previously mentioned, the vent patterns 204a, 204b may be scored into the sealing film 100 at a depth that does not puncture the sealing film 100. Further, because no secondary seals or other connections or attachments within or along the food package 200 shields the weakened wall pattern 114 from the pressure generated in the inner region 120 during heating, the weakened wall pattern 114 is able to expand with the rest of the sealing film 200 during the cooking or heating cycle. Accordingly, the weakened wall pattern 114 may remain closed until the pressure within the inner region 120 of the food package 200 causes the sealing film 100 to expand to a size that tears or cracks at least a portion of the weakened wall pattern 114, and thereby opens at least a portion of one or more of the vents 201a, 201b. At least initially, this tearing may take the form of micro-voids or cracks along at least a portion of the weakened wall pattern 114, through which excess pressure may be released from the inner region of the food package. However, if the pressure level within the inner region 120 continues to rise, and the sealing film 100 continues to expand, the size and/or number of the cracks and micro-voids along the weakened wall pattern 114 may increase, thereby reducing the pressure in the inner region 120.

In some instances, the sealing film 100 may continue to expand until the size or number of micro-voids and/or cracks results in larger tears in at least sections of the weakened wall pattern 114. However, the size of the tear in the weakened wall pattern 114 is controlled, or limited, by the size of the vent pattern 204a, 204b. For example, in the embodiment illustrated in FIG. 5, if the vent pattern 202a is a circle having an approximately 12 mm diameter, the largest vent 201a created by the tearing or separation along the weakened wall pattern 114 is generally circular in shape and has an approximately 12 mm diameter. By controlling or limiting the maximum size of the vent 201a generated about the weakened wall pattern 114, the amount of pressure released through the vent(s) 201a, 201b is controlled, which allows the pressure and/or temperature within the inner region 120 to be maintained at a desirable level for heating.

FIG. 8 is a perspective view of a food package 300 in the form of a freezable, microwaveable tray container 302 covered by a sealing film 100 having a vent system 202 according to an embodiment of the present invention. The tray container 302 may have a variety of different shapes, including rectangular, square, circular, oval, trapezoidal, and triangular, among others.

Figure 6:
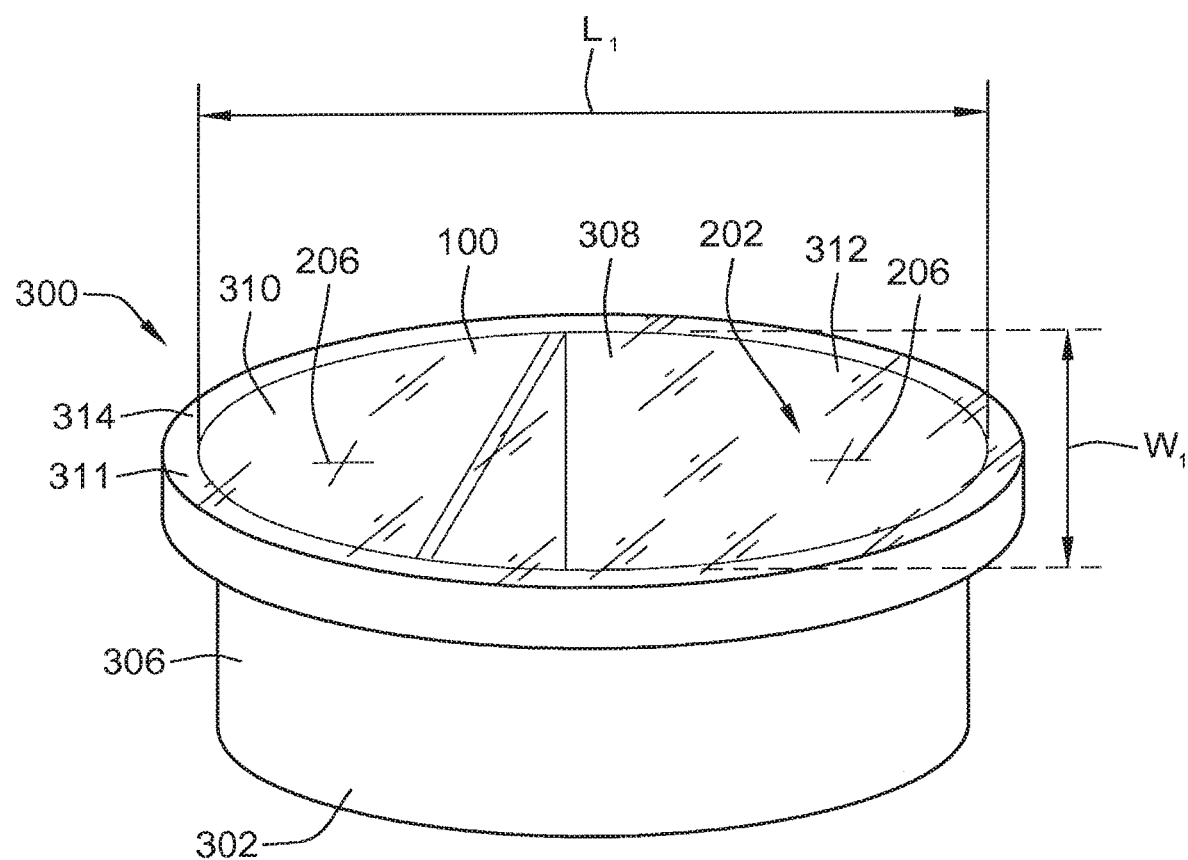
FIG. 6 is a perspective view of a food package in the form of a freezable, microwaveable tray container covered by a sealing film having a vent system according to an embodiment of the present invention.

The tray container 302 illustrated in FIG. 6 has a generally oval shape. The tray container 302 may include sidewalls 306 that define a recessed inner region 308. The inner region 308 may be comprised of at least one food compartment 310, 312 that is configured to receive a food product. The inner region 308 may be covered by a sealing film 100 that is attached to a top portion 311 of the tray container 302. For example, in the embodiment illustrated in FIG. 6, an upper flange area 314 may be connected to, or part of, the sidewalls 308, and may provide a surface for attaching or sealing the sealing film 100 to the tray container 302. The sealing film 100 may be used in combination with the tray container 302 to hermetically seal the food product contained in the inner region 308.

The vent system 202 used with a food package 300 having a tray container 300 may be similar to that previously discussed above for the pouch-shaped food package 200. Moreover, the vent system 202 may include at least one vent pattern 206 that has been scored into the sealing film 100 to create a weakened wall pattern 114. For example, as shown in FIG. 6, the vent system 202 may include two vent patterns that are each cross-shaped.

Further, each vent pattern 204, 206 has a vent pattern span, which is the larger of the maximum width and length of the vent pattern 204, 206. The inner region 120, 308 has an inner region span, which is the larger of the maximum width and length of the inner region 120, 308. For example, if the maximum length of the inner region 120, 308 of the pouch-shaped or tray-container food package 200, 300, as labeled in FIGS. 4 and 6 as "$L_1$", is 9 inches, and the maximum width of the Inner region 120, 308 of 6.5 Inches (17 cm), as labeled "$W_1$", than the size of the inner region span is the maximum length, i.e. 9 inches (23 cm). Conversely, if the maximum width is 9 inches (23 cm), and the maximum length is 6.5 (17 cm), than the size of the inner region span is equal to the maximum width, i.e. 9 Inches (23 cm). However, if the maximum width and length of the Inner region 4), 308 are equal, than either may be used for purposes of determining the size of the inner region span. Similarly, if the maximum length and width of the vent pattern 204, 206 are equal (as indicated in FIG. 4 as "$L_2$" and "$W_2$" respectively), than either size may be used for purposes of determining the size of the vent pattern span.

The vent pattern span for each vent pattern 204, 206 of the present invention may be sized to be a fraction of the Inner region span. For example, according to certain embodiments, if the inner region span is 9 inches (23 cm), and each vent pattern has an Individual vent pattern span of 12 mm, such as a vent pattern 204 being a circle having a diameter of 12 mm, or a cross shaped vent pattern 206 comprised of two intersecting lines, the longest, or both lines, having a length of 12 mm, vent pattern span is approximately 5% of the size of the inner region span. However, the difference between the size of the Inner region span and the vent pattern span may depend on a number of different factors, including the type of food product being packaged and the size of the food package 200, 300. For example, according to certain embodiments of the present invention, each individual vent pattern span may be from 1% to 100% of the size of the Inner region span. According to some embodiments, each vent pattern may have a vent pattern span that is from 1% to 50% of the size of the Inner region span. According to other embodiments, each vent pattern may have a vent pattern span that is from 2% to 15% of the size of the inner region span. According to other embodiments, each vent pattern may have a vent pattern span that is from 4% to 8% of the size of the inner region span. Further, the vent system 202, 304 of the present invention may have more than one vent pattern 204, 206, and each vent pattern may have the same or a different vent pattern span.

Example 1

Pouch-Shaped Food Package Having Circular Vent Scoring Patterns

An approximately 6.5 inch (17 cm) wide by 9 inch (23 cm) long food package was formed in the shape of a pouch using Pliant's freezable/microwaveable Steam Quick™ laminate. The food package included two end seals, each having a width of approximately 0.4 cm to approximately 1.2 cm, which allowed for an Inner region span of approximately 14.6 cm to approximately 16.2 cm. The food package included two vent scoring patterns in the form of circles having approximately 12 mm diameters. The vent patterns were scored into the laminate with the use of a 10.2 μm wavelength $CO_2$ laser at about 40 watts of power and scanned at about 70 ft/min (0.36 msec), and did not perforate the laminate. The inner region of the pouch was filled with 12 ounce (340 g) of frozen broccoli cuts and manually hand sealed by a heat sealer. The food package was then stored in a freezer for 24 hours at −5° F. (−21° C.).

Upon removing the food package from the freezer, the food package was placed in a microwave, and underwent 6 minutes of cook time at approximately 1200 watts of power.

One pressure probe and four temperature probes were inserted into the pouch before, during, and after the cook cycle. The food package was also observed expanding during the cook cycle, along with the weakened wall along the two scored vent patterns opening accordingly to release heat and steam during the cook cycle. The maximum pressure detected by the pressure probe in the microwave testing was 0.98 psi (0.07 bar). The maximum temperature reached was 229.4° F. (110° C.). The food temperature was 193.5° F. (90° C.). The food was also observed to have been cooked uniformly.

Example 2

Pouch-Shaped Food Package Having Cross Vent Scoring Patterns

An approximately 6.5 inch (17 cm) wide by 9 inch (23 cm) long food package was formed in the shape of a pouch using Pliant's freezable/microwaveable Steam Quick™ laminate. The food package included two end seals, each having a width of approximately 0.4 cm to approximately 1.2 cm, which allowed for an Inner region span of approximately 14.6 cm to approximately 16.2 cm. The food package included two vent scoring patterns in the form of crosses, with the length of each line in the cross being approximately 12 mm long. The vent patterns were scored into the laminate with the use of a 10.2 μm wavelength $CO_2$ laser at about 40 watts of power and scanned at about 70 it/min (0.36 m/sec), and did not perforate the laminate. The inner region of the pouch was filled with 12 ounce (340 g) of frozen broccoli cuts and manually hand sealed by a heat sealer. The food package was then stored in a freezer for 24 hours at −5° F. (−21° C.).

Upon removing the food package from the freezer, the food package was placed in a microwave, and underwent 6 minutes of cook time at approximately 1200 watts of power. One pressure probe and four temperature probes were inserted into the pouch before, during, and after the cook cycle. The food package was also observed expanding during the cook cycle, along with the weakened wall along the two scored vent patterns opening accordingly to release heat and steam during the cook cycle. The maximum pressure detected by the pressure probe in the microwave testing was 1.3 psi (0.09 bar). The maximum temperature reached was 219.4° F. (104° C.). The food temperature measured was 192.3° F. (89° C.). The food was also observed to have been cooked uniformly.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the Invention not be limited to the particular embodiment disclosed, but that the invention will include all embodiments falling within the scope of the appended claims. Further, at least some of the numerical ranges stated above are not necessarily critical.

What is claimed:

1. A microwaveable heatable package comprising:
an inner region configured to receive a product;
a sealing film, the sealing film being comprised of at least one layer of a microwavable film adapted for use in heating the product, the sealing film having an outer surface and an inner surface, the inner region of the heatable package being hermetically sealed by at least a portion of the sealing film; and
at least one weakened wall pattern scored by a laser into a portion of the outer surface of the sealing film, the weakened wall pattern having a thickness less than an unscored sealing film thickness, the inner surface adjacent to each wakened wall pattern being directly exposed to pressure generated in the inner region,
wherein the weakened wall pattern forms a vent pattern having a vent pattern span that is the greater of a vent pattern length and a vent pattern width,
wherein the inner region has an inner region span that is the greater of an inner region length and an inner region width,
wherein the vent pattern span is from about 1% to about 50% of the inner region span.

2. The microwaveable heatable package of claim 1, wherein the vent pattern span is from about 1% to about 15% of the inner region span.

3. The microwaveable heatable package of claim 1, wherein the vent pattern span is from about 2% to about 15% of the inner region span.

4. The microwaveable heatable package of claim 1, wherein the vent pattern span is from about 4% to about 8% of the inner region span.

5. The microwaveable heatable package of claim 1, wherein the vent pattern is a non-linear vent pattern.

6. The microwaveable heatable package of claim 1, wherein the weakened wall pattern has a thickness of about 5 μm to about 25 μm.

7. The microwaveable heatable package of claim 1, wherein the weakened wall pattern has a thickness sufficient to maintain in the heatable package a steam pressure of at least about 0.25 psi during heating.

8. The microwaveable heatable package of claim 1, wherein the weakened wall pattern has a thickness sufficiently thin to tear at a steam pressure of less than or equal to about 2 psi during heating.

9. The microwaveable heatable package of claim 1, wherein the vent pattern is disposed proximate a fin seal.

10. A microwaveable heatable package comprising:
an inner region configured to receive a product;
a sealing film, the sealing film being comprised of at least one layer of a microwavable film adapted for use in heating the product, the sealing film having an outer surface and an inner surface, the inner region of the heatable package being hermetically sealed by at least a portion of the sealing film; and
at least one weakened wall pattern scored by a laser into a portion of the outer surface of the sealing film, the weakened wall pattern having a thickness less than an unscored sealing film thickness, the inner surface adjacent to each wakened wall pattern being directly exposed to pressure generated in the inner region,
wherein the weakened wall pattern forms a vent pattern,
wherein the sealing film has an unscored thickness, and
wherein the weakened wall pattern thickness is from about 5% to about 30% of the unscored thickness of the sealing film.

11. The microwaveable heatable package of claim 10, wherein the unscored sealing film thickness is about 89 μm.

12. The microwaveable heatable package of claim 10, wherein the weakened wall pattern thickness is from about 5 μm to about 25 μm.

13. The microwaveable heatable package of claim 10, wherein the weakened wall pattern has a thickness sufficient to maintain in the package a steam pressure of at least about 0.25 psi during heating.

14. The microwaveable heatable package of claim 10, wherein the weakened wall pattern has a thickness sufficiently thin to tear at a steam pressure of less than or equal to about 2 psi during heating.

15. The microwaveable heatable package of claim 10, wherein the vent pattern is a non-linear vent pattern.

16. The microwaveable heatable package of claim 10, wherein the vent pattern is disposed proximate a fin seal.

17. A microwaveable heatable package comprising:
    at least one non-linear vent pattern scored into a sealing film by a laser at a depth that does not perforate the sealing film to form a weakened wall pattern, the at least one non-linear vent pattern having a wall thickness of approximately 5 micron to approximately 25 micron, and each vent pattern having a vent pattern span that is the greater of a length and a width of that vent pattern;
    wherein at least a portion of the sealing film is sealed to form a pouch, the pouch having an inner surface defining an inner region that is configured to receive a product therein, at least a portion of the inner surface being adjacent to the weakened wall pattern;
    wherein the pouch is sealed to seal hermetically the product contained in the inner region, the inner region having an inner region span that is equal to the greater of a maximum length and a maximum width of the inner region,
    wherein the vent pattern is from about 2% to about 15% of the inner region span; and
    wherein at least a portion of the vent pattern is configured to tear when a pressure generated in the inner region exceeds a predetermined magnitude.

18. The microwaveable heatable package of claim 17, wherein the vent pattern span is from about 4% to about 8% of the inner region span.

19. The microwaveable heatable package of claim 17, wherein the vent pattern is scored by a CO2 laser using an approximately 10.2 µm wavelength.

20. The microwaveable heatable package of claim 17, wherein the vent pattern is scored by a CO2 laser using an approximately 10.6 µm wavelength.

* * * * *